(12) United States Patent
Müller et al.

(10) Patent No.: US 8,131,425 B2
(45) Date of Patent: Mar. 6, 2012

(54) OPTICAL STEERING ANGLE SENSOR FOR DETERMINING THE ABSOLUTE VALUE OF THE STEERING ANGLE

(75) Inventors: Horst Müller, Florstadt (DE); Holger Franz, Mespelbrunn (DE); Thomas Sauerwein, Großwallstadt (DE); Markus Stollberg, Großwallstadt (DE)

(73) Assignee: Takata-Petri AG, Aschaffenburg (DE)

( * ) Notice: Subject to any disclaimer, the term of this patent is extended or adjusted under 35 U.S.C. 154(b) by 439 days.

(21) Appl. No.: 12/520,331

(22) PCT Filed: Dec. 17, 2007

(86) PCT No.: PCT/EP2007/064034
§ 371 (c)(1),
(2), (4) Date: Jun. 19, 2009

(87) PCT Pub. No.: WO2008/074763
PCT Pub. Date: Jun. 26, 2008

(65) Prior Publication Data
US 2010/0023219 A1    Jan. 28, 2010

(30) Foreign Application Priority Data
Dec. 20, 2006 (DE) .................. 10 2006 061 929

(51) Int. Cl.
B62D 61/00 (2006.01)
B62D 11/00 (2006.01)
B62D 12/00 (2006.01)
(52) U.S. Cl. ............ 701/41; 701/42; 180/400; 180/443; 180/444; 73/117.02

(58) Field of Classification Search ............. 701/41–42; 180/400, 443, 444; 341/13; 250/231.13, 250/231.14, 231.18; 73/117.02
See application file for complete search history.

(56) References Cited

U.S. PATENT DOCUMENTS
6,410,909 B1   6/2002   Rudolph et al.
(Continued)

FOREIGN PATENT DOCUMENTS
CN   1311852 A   9/2001
(Continued)

OTHER PUBLICATIONS

Design of Fast Steering Mirror systems for precision laser beams steering; Qingkun Zhou; Ben-Tzvi, P.; Dapeng Fan; Goldenberg, A.A.; Robotic and Sensors Environments, 2008. ROSE 2008. International Workshop on; Digital Object Identifier: 10.1109/ROSE.2008.4669196; Publication Year: 2008 , pp. 144-149.*

(Continued)

*Primary Examiner* — Cuong H Nguyen
(74) *Attorney, Agent, or Firm* — Fitch Even Tabin & Flannery

(57) ABSTRACT

An optical steering angle sensor for determining the absolute value of the steering angle even when a steering wheel has been revolved several times is provided, having a stator, a rotor with a barcode and evaluation electronics. In one form, the invention provides for the rotor to have a track groove which is arranged in the form of a worm in order to determine the number of revolutions, which track groove has an associated driver finger on the stator, which engages in the track groove and is arranged in a bearing such that it can pivot, and has a holder for a magnet which can pivot with the driver finger and which driver finger has an associated stationary Hall sensor, which is provided in an evaluation circuit.

9 Claims, 3 Drawing Sheets

U.S. PATENT DOCUMENTS

| | | | |
|---|---|---|---|
| 6,459,389 B1 | 10/2002 | Germuth-Löffler et al. | |
| 6,483,104 B1 | 11/2002 | Benz et al. | |
| 6,691,565 B2* | 2/2004 | Font | 73/117.02 |
| 7,726,208 B2* | 6/2010 | Hoeller et al. | 73/862.331 |
| 8,036,793 B2* | 10/2011 | Auguet et al. | 701/42 |
| 2002/0022913 A1* | 2/2002 | Font | 701/41 |
| 2002/0038171 A1* | 3/2002 | Deguchi et al. | 701/41 |
| 2004/0262063 A1* | 12/2004 | Kaufmann et al. | 180/169 |
| 2006/0059698 A1 | 3/2006 | Staudt et al. | |
| 2006/0085111 A1* | 4/2006 | Kojima | 701/38 |
| 2006/0174499 A1* | 8/2006 | Staudt et al. | 33/1 R |
| 2008/0150519 A1* | 6/2008 | Hoeller et al. | 324/207.2 |
| 2008/0189012 A1* | 8/2008 | Kaufmann | 701/41 |

FOREIGN PATENT DOCUMENTS

| | | | |
|---|---|---|---|
| DE | 196 38 911 A1 | | 3/1998 |
| DE | 197 58 104 A1 | | 7/1999 |
| DE | 198 19 664 A1 | | 11/1999 |
| DE | 100 41 507 | * | 11/2000 |
| DE | 100 41 507 A1 | | 2/2002 |
| DE | 20 2004 014 849 U1 | | 3/2005 |
| DE | 20 2005 001 887 U1 | | 7/2005 |
| DE | 10 2006 055 049.8 | * | 11/2006 |
| EP | 06425561.5 | * | 8/2006 |
| EP | 07010069 | * | 5/2007 |
| JP | 2000-297313 | * | 9/2000 |
| JP | 2006-058173 A | | 3/2006 |

OTHER PUBLICATIONS

Characterization of dynamic behavior of flexure-based mechanisms for precision angular alignment; Shilpiekandula, V.; Youcef-Toumi, K.; American Control Conference, 2008; Digital Object Identifier: 10.1109/ACC.2008.4586953; Publication Year: 2008, pp. 3005-3010.*

An opto-electronic 18 b/revolution absolute angle and torque sensor for automotive steering applications; Mortara, A. et al.; Solid-State Circuits Conference, 2000. Digest of Technical Papers. ISSCC. 2000 IEEE International; Digital Object Identifier: 10.1109/ISSCC.2000.839740.*

United steering of Control Moment Gyros for small satellite with limited gimbal rate; Kai Xu; Guang Jin; Changqing Chen; Information and Automation (ICIA), 2010 IEEE International Conference on; Digital Object Identifier: 10.1109/ICINFA.2010.5512041; Publication Year: 2010, pp. 1489-1493.*

Notification of the First Office Action issued in counterpart Chinese Application No. 200780031150.7 dated Jun. 10, 2010 (5 pages) and an English translation of the same (8 pages).

English translation of the International Preliminary Report on Patentability (Chapter I or Chapter II of the Patent Cooperation Treaty) from the International Bureau of WIPO for International Application No. PCT/EP2007/064034 dated Jul. 16, 2009, 9 pages.

* cited by examiner

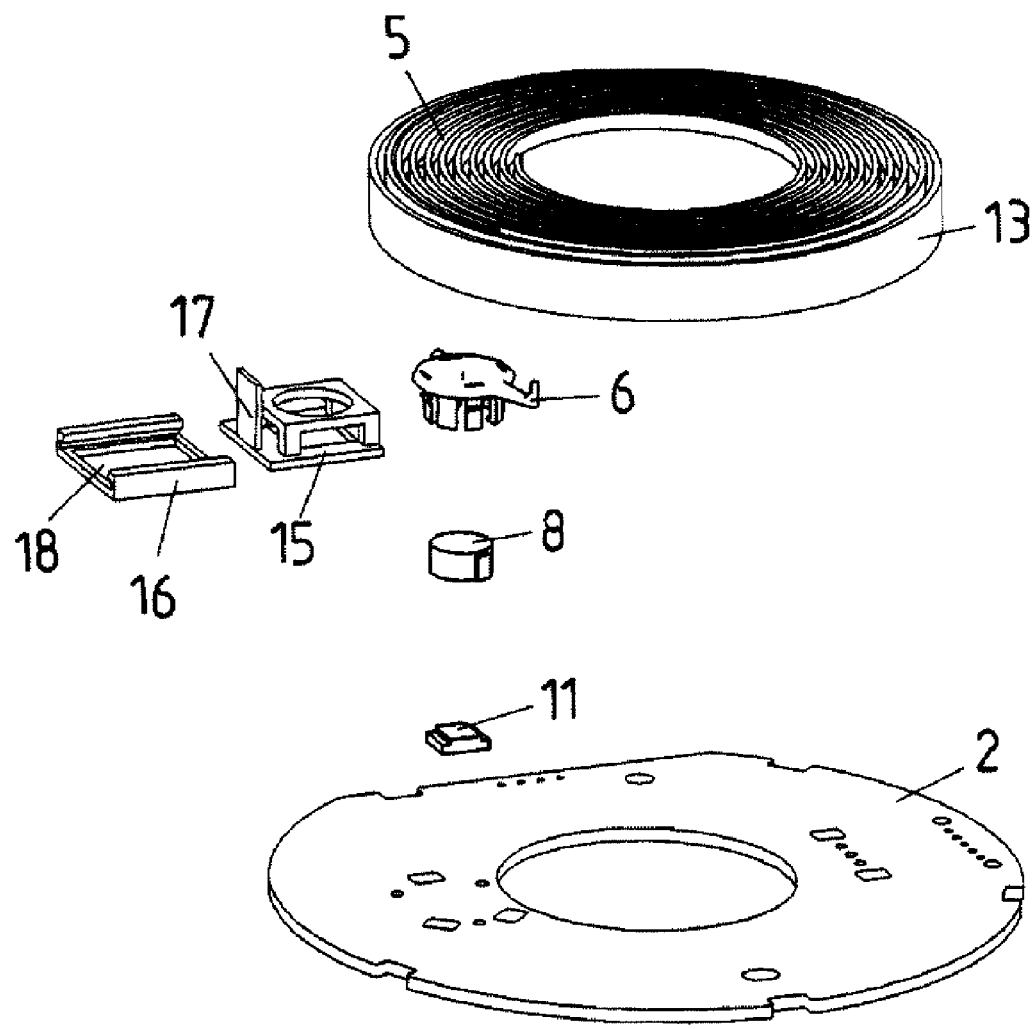

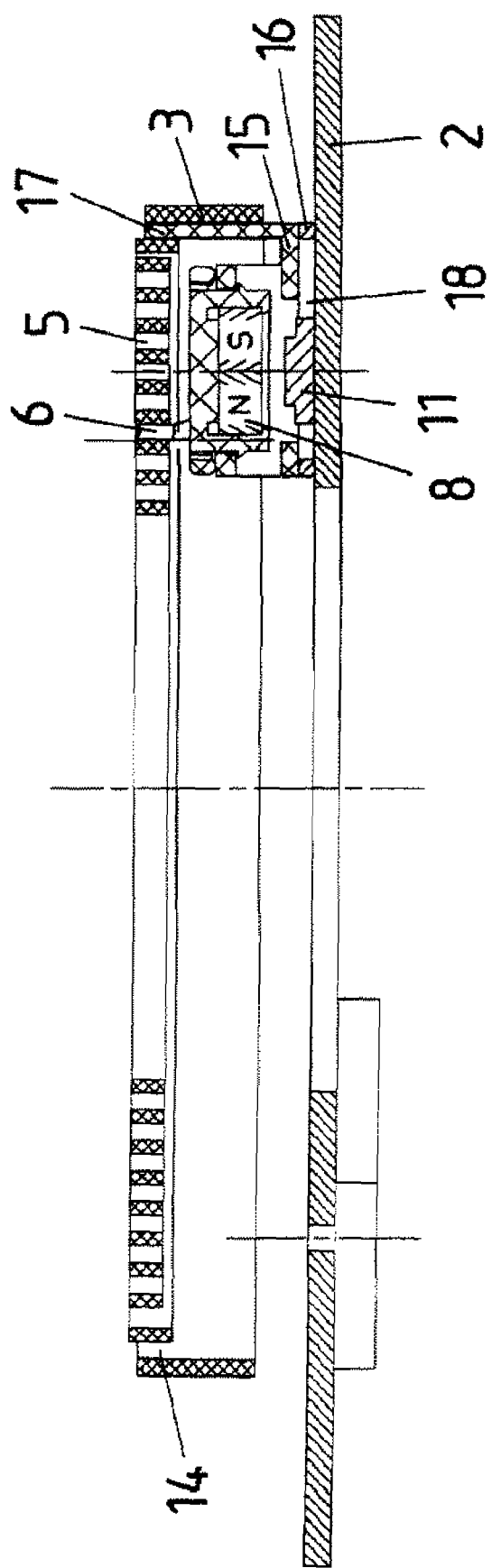

OPTICAL STEERING ANGLE SENSOR FOR DETERMINING THE ABSOLUTE VALUE OF THE STEERING ANGLE

CROSS-REFERENCE TO RELATED APPLICATIONS

This application is a U.S. national phase application filed under 35 U.S.C. §371 of International Application PCT/EP2007/064034, filed on Dec. 17, 2007, designating the United States, which claims priority from German Application 10 2006 061 929.3, filed Dec. 20, 2006, which are hereby incorporated herein by reference in their entirety.

FIELD OF THE INVENTION

The invention relates to an optical steering angle sensor for determining the absolute value of the steering angle.

BACKGROUND OF THE INVENTION

Steering angle sensors for determining the absolute value of the steering angle are known in a wide variety of embodiments. In addition to identifying multiple revolutions by means of a gear mechanism or using a magnet arrangement which identifies multiple revolutions independently of the supply voltage, steering angle sensors in which the absolute value of the steering angle is determined by means of an optical arrangement are also known. For example, DE 100 41 507 A1 discloses a steering angle sensor for motor vehicles, in which steering angle sensor a code track is provided on one of two assemblies which can be rotated relative to one another, and in which steering angle sensor a detection device for scanning the code track is provided, this detection device being associated with the other assembly and generating a signal, from which the steering angle can be determined, when the code track is scanned.

This steering angle sensor has the disadvantage that, although a steering angle is always identified provided that the steering wheel is no longer being turned as a revolution, it is only possible to identify a multiple revolution for as long as the supply voltage is connected. If this supply voltage were disconnected, for example when parked, this steering angle sensor is thus no longer in a position to identify the actual number of steering wheel revolutions after the ignition is switched on.

The absolute optical angle sensor of DE 197 58 104 A1 also exhibits this disadvantage.

SUMMARY OF THE INVENTION

The invention is therefore based on the object of providing, in steering angle sensors in which, on account of their design, the actual number of steering wheel revolutions cannot be identified after the ignition is switched on, an auxiliary apparatus which allows several revolutions to be identified independently of the supply voltage.

According to the invention, the object is achieved in accordance with the features described hereinafter.

In an optical steering angle sensor for determining the absolute value of the steering angle even in the case of multiple revolutions of a steering wheel, having a stator, a rotor with a barcode, and an evaluation electronics system, provision is made, according to the invention, for the rotor to have, for detecting revolutions, a track groove which is arranged in a worm-like manner, which has an associated driver finger on the stator, which driver finger engages in the track groove and is arranged in a bearing such that it can pivot, and has a holder for a magnet which can be pivoted with the driver finger and which has an associated stationary Hall sensor which is provided in an evaluation circuit.

In this apparatus, the angle through which the driver finger is pivoted in the track groove, is therefore detected by means of the magnet and the Hall sensor which pivot together with the driver finger. Since the driver finger remains in its position after the supply voltage is switched off, a multiple revolution is identified after the ignition is switched back on.

The holder for the magnet is preferably provided in the bearing ring of the driver finger and the magnet is fitted directly over the Hall sensor. The magnet provided is preferably a permanent magnet which is mounted such that its north pole and south pole are at the same distance from the Hall sensor. This polarity rotates as a function of the position of the driver finger. The Hall sensor detects this position and uses it to determine the absolute steering angle over 360°.

The track groove is preferably designed such that the driver finger can be moved once from one end of the track groove to the other end for eight revolutions of the rotor. In this case, the driver finger is arranged such that the angle which is covered as the driver finger moves through the track groove is so great that it is possible to identify eight revolutions of the rotor but that the angle is not greater than 90°.

In a further refinement of the invention, a compensation apparatus is provided for eliminating the radial tolerances which occur at a steering wheel spindle. This can be designed such that a compensation track is additionally provided on the rotor, which compensation track is in the form of a concentric groove and has, on the stator, an associated slide which engages in the groove and can move linearly over the Hall sensor, with the displacement length of the slide being greater than the radial tolerance of the steering spindle. The slide is guided in the concentric groove such that its position relative to the centre of the rotor with the track groove is always the same. Since the slide is fixed in its radial position by the concentric groove, an eccentricity of the steering spindle does not have any effect.

In the steering angle sensor according to the invention for determining the absolute steering angle, the rotor has, on its circumference, a barcode which is provided over an angle of 360°, for detecting the steering angle within one revolution.

The stator is preferably in the form of a printed circuit board which at least partially comprises evaluation electronics.

BRIEF DESCRIPTION OF THE DRAWINGS

The invention will be explained in exemplary embodiments with reference to drawings, in which:

FIG. 3 shows an exploded illustration of the components of the apparatus according to the invention in a second embodiment;

FIG. 4 shows a section through the rotor according to FIG. 3.

DETAILED DESCRIPTION OF THE PREFERRED EMBODIMENTS

Figure 1:
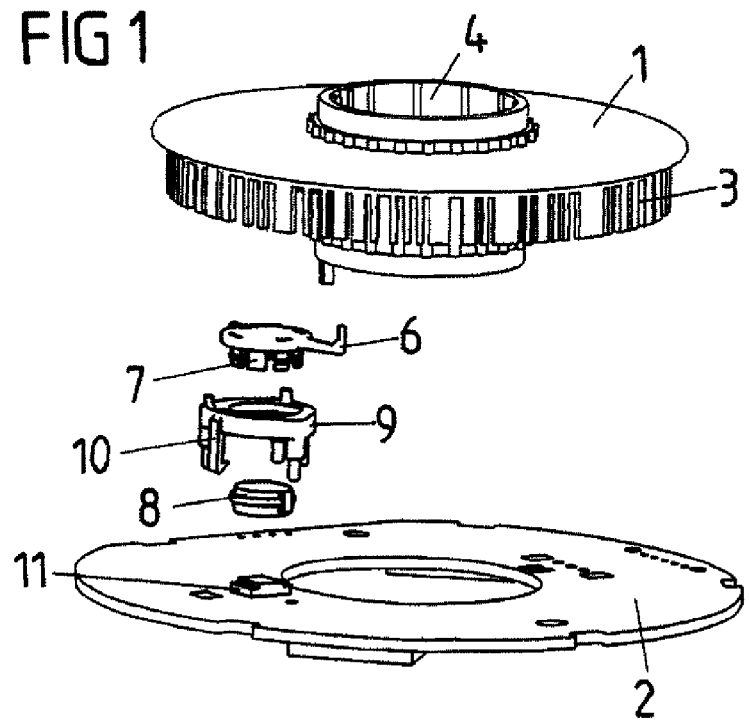
FIG. 1 shows an exploded illustration of the components of the apparatus according to the invention in a first embodiment.

The essential components of an apparatus according to the invention in a first embodiment are illustrated in FIG. 1. The apparatus has a rotor 1 and a stator 2. A barcode (3) is provided on the circumference of the rotor 1 in a known manner, said barcode extending over the entire 360° of the circumference. This code is used to determine the absolute rotary angle of a steering spindle within one complete revolution of 360°. The steering spindle is not illustrated in FIG. 1. It passes through a concentric aperture 4 in the rotor. The rotor has a track groove 5 (FIG. 2) in which a driver finger 6 engages. Said driver finger has a holder 7 for a magnet 8 which is mounted in the bearing ring 7a of the driver finger. The driver finger 6 is mounted in a bearing 9 such that it can pivot. This bearing is arranged on the stator 2 in a stationary manner and is fixed there by means of latching elements 10, of which only one element can be seen in FIG. 1. The magnet 8 has an associated Hall sensor 11 on the magnet, with the magnet 8 being arranged directly over the Hall sensor 11.

Figure 2:
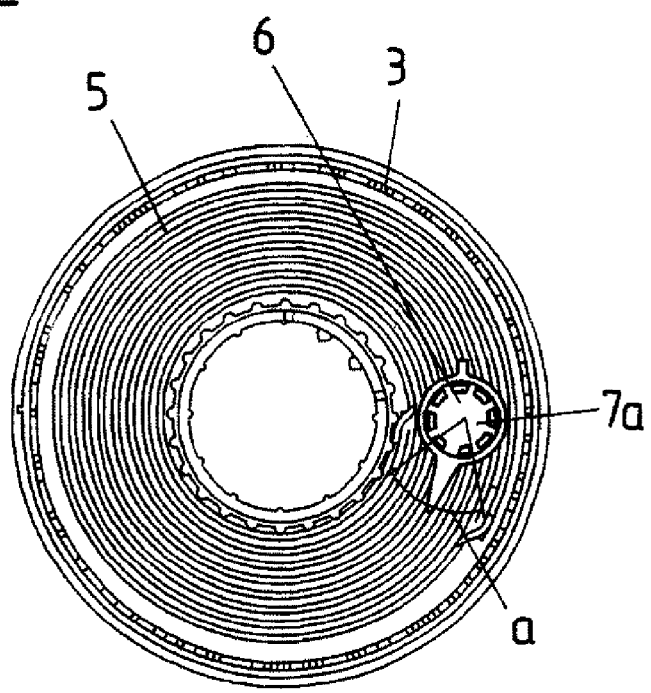
FIG. 2 shows the rotor with the track groove and the driver finger.

The position of the driver finger 6 as illustrated in FIG. 2 corresponds approximately to the position of the steering wheel (not illustrated) when driving straight ahead. When the steering wheel is turned in one direction, the driver finger 6 pivots inward or outward depending on whether the track groove 5 runs from the inside to the outside or vice versa. When the steering wheel is turned in the other direction, the driver finger 6 pivots in the opposite direction. In this case, the magnet 8 pivots together with it. This pivoting is detected by the Hall sensor 11 and is associated with a specific number of revolutions in the evaluation electronics. The driver finger 6 retains its current position after the ignition is switched off and the supply voltage is thus interrupted. This position also remains unchanged after re-ignition, so that the number of revolutions of the steering wheel is detected by means of the Hall sensor 11 immediately after ignition. Since the absolute steering angle within one revolution of the steering wheel is likewise detected again by means of the barcode 3 after ignition, that is to say after the supply voltage is switched on, the absolute steering angle is also available for a multiple revolution of the steering wheel immediately after the supply voltage is switched on. As can be seen in FIG. 2, the driver finger 6 is arranged such that the angle a, which is covered as the driver finger 6 moves through the track groove 5, is so great that it is possible to identify eight revolutions of the rotor, but that the angle is not greater than 90°.

In the embodiment of FIG. 3, a rotor 13 is provided, which rotor differs from the rotor 1 of the first embodiment in that it has an additional concentric, groove-like track 14 which can be seen in FIG. 4. This track 14 has an associated slide 15 which can move in a straight line in a guide 16 which is fixed on the stator 2. The slide 15 has a driver 17 which engages in the track. The slide 15 is also in the form of a bearing for the driver finger 6, in which the magnet 8 is mounted, as in the first embodiment. As in the first embodiment, this magnet is arranged directly over the Hall sensor 11 which, for its part, is fixed within the free space 18 of the guide 16 on the stator 2. The slide 15 can therefore move linearly over the Hall sensor 11.

Since the slide 15 is fixed in its radial position with respect to the rotor 13 by the concentric groove-like track 14, an eccentricity of the steering spindle does not have any effect, that is to say the driver finger 6 cannot be trapped in the track groove 5. An eccentricity of the steering spindle would only lead to the slide 15 shifting radially in the guide 16 and therefore also in relation to the Hall sensor 11. However, since they are only small shifts in this case, detection of the multiple revolution is not influenced by the Hall sensor.

The invention claimed is:

1. An optical steering angle sensor for determining the absolute value of the steering angle even in the case of multiple revolutions of a steering wheel, having a stator, a rotor with barcode, and an evaluation electronics system, characterized in that the rotor has, for detecting revolutions, a track groove which is arranged in a worm-like manner, which has an associated driver finger on the stator, which driver finger engages in the track groove and is arranged in a bearing such that it can pivot, and has a holder for a magnet which can be pivoted with the driver finger and which has an associated stationary Hall sensor which is provided in an evaluation circuit.

2. The steering angle sensor as claimed in claim 1, characterized in that the holder for the magnet is provided in the bearing ring of the driver finger, and in that the magnet is fitted directly over the Hall sensor.

3. The steering angle sensor as claimed in claim 1 or 2, characterized in that the magnet provided is a permanent magnet which is mounted such that its north pole and south pole are at the same distance from the Hall sensor.

4. The steering angle sensor as claimed in claim 1, characterized in that the track groove is designed such that the driver finger can be moved once from one end of the track groove to the other end for eight revolutions of the rotor.

5. The steering angle sensor as claimed in claim 1, characterized in that the driver finger is arranged such that the angle which is covered as the driver finger moves through the track groove is so great that it is possible to identify eight revolutions of the rotor, but that the angle is not greater than 90°.

6. The steering angle sensor as claimed in claim 1, characterized in that a compensation apparatus is provided for eliminating the radial tolerances which occur at a steering wheel spindle.

7. The steering angle sensor according to claim 6, characterized in that a compensation track is additionally provided on the rotor, said compensation track being in the form of a concentric groove and having, on the stator, an associated slide which engages in the groove and can move linearly over the Hall sensor, with the displacement length of the slide being greater than the radial tolerance of the steering spindle.

8. The steering angle sensor as claimed in claim 1, characterized in that the rotor has, on its circumference, a barcode which is provided over an angle of 360°, for detecting the steering angle within one revolution.

9. The steering angle sensor as claimed in claim 1, characterized in that the stator is in the form of a printed circuit board which at least partly comprises the evaluation electronics system.

* * * * *